June 17, 1941.                C. G. TURNER                 2,246,424
                    DOUGH CUTTING AND PANNING DEVICE
                       Filed Jan. 31, 1939         2 Sheets-Sheet 1
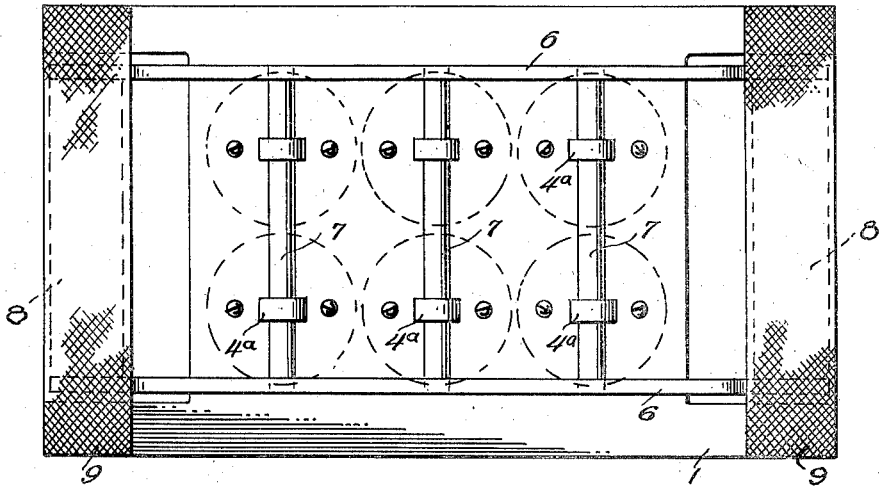
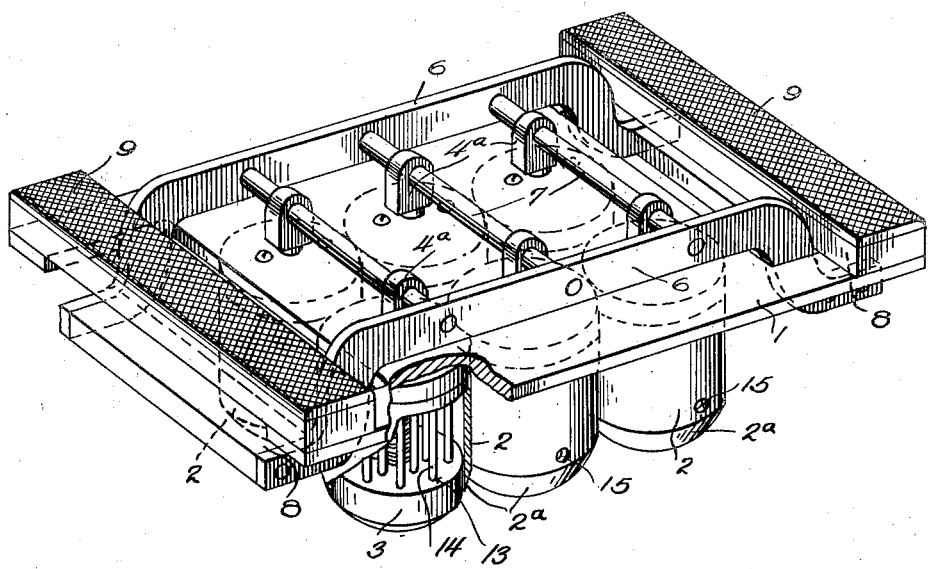
Inventor
C. Gainer Turner
By Dorsey, Cole & Garner
Attorneys June 17, 1941. C. G. TURNER 2,246,424
DOUGH CUTTING AND PANNING DEVICE
Filed Jan. 31, 1939 2 Sheets-Sheet 2
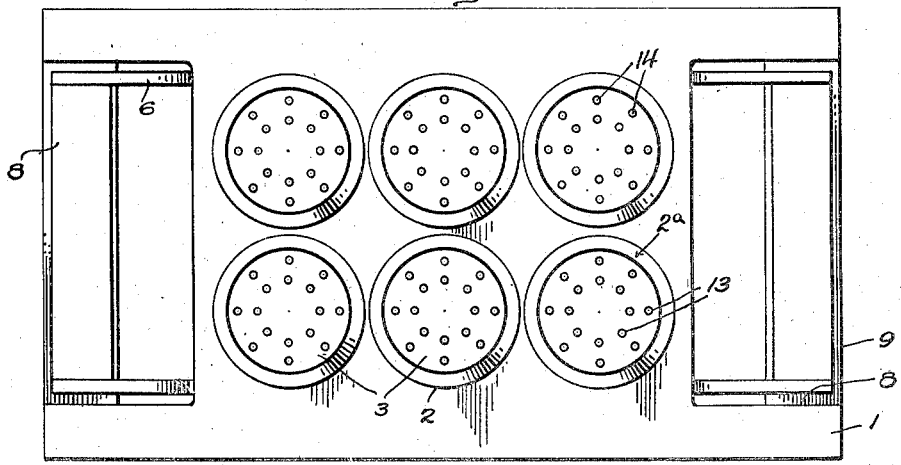
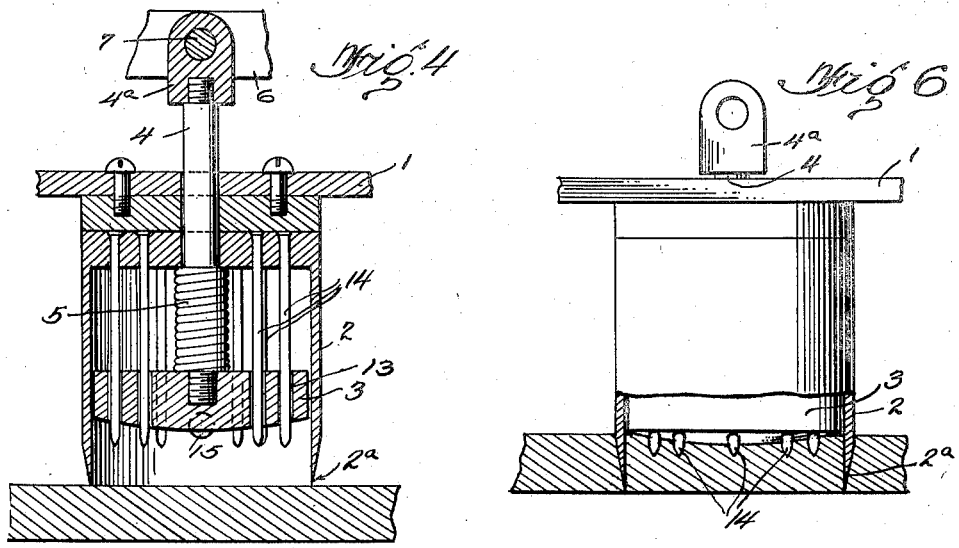
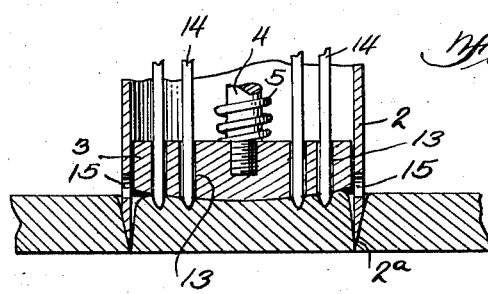
Inventor
C. Gainer Turner
By Dorsey, Cole & Garner
Attorneys Patented June 17, 1941

2,246,424

UNITED STATES PATENT OFFICE 2,246,424

DOUGH CUTTING AND PANNING DEVICE

Charles Gainer Turner, Atlanta, Ga.

Application January 31, 1939, Serial No. 253,901

3 Claims. (Cl. 107—26)

This invention relates to an improvement in a combined dough cutting, panning and handling device. The primary object of the invention is to provide a dough cutter which is designed not only to cut a sheet of dough into blanks of the desired shape but also to use the cutter to perform the function whereby the cut dough blank may be lifted while within the cutter direct to a baking pan or other vessel.

This art discloses many types of dough cutters and the use of the same in cutting and picking up or panning dough blanks. Actual practice and long experience discloses that no cutter will cut dough and retain the same a sufficient length of time within the cutter for subsequent panning unless additional means are provided to cause the dough blanks to be retained within the cutter. It has heretofore been proposed to cut the dough blanks with a body having a circular formation composed of a plurality of narrow vertically disposed blades arranged in an edge-to-edge relation and thereafter contract the lower edge of the cutter around the blank to remove the same in the cutter to a pan. It has also been proposed to have dependent finger or fingers which after the cutter has penetrated the dough and formed the blank, the finger or fingers open up under the blank to retain the cut blank within the cutter so that the cutter and blank therein can be removed to a pan. Both of the above proposals have disadvantages, and in the first instance, the blank is not completely cut from the rolled sheet of dough and therefore the cutter cannot be used in panning the blank as the partially cut blank will be pulled from within the cutter by the unsevered dough. The second suggestion offers the disadvantage that the fingers mar and distort the blank which gives a damaged product after the final baking.

In actual practice, a sheet of yeast dough will shrink considerably and quickly when cut into blanks. This shrinking, no doubt, is caused by the cutter penetrating the skin of the dough sheet thus allowing air to escape and the dough to fall and contract away from the wall of the cutter.

To overcome the disadvantages enumerated above in the cutters and panners heretofore used, and also to accommodate yeast risen dough, I propose to compress and expand diametrically the blank of dough against the wall of the cutter immediately after the cutting or severing operation. This expanding step in the blank severing operation is done so that the blank will be in intimate contact with the wall of the cutter, all of which will tend to shape and retain the blank within the cutter for an indefinite time and until the blank is ejected therefrom by the ordinary plunger used for this purpose.

It will be seen that the invention provides a cutter of the above described character which is readily manipulated by the hands for performing the cutting and panning steps. The invention will be best understood from consideration of the following detail description taken in connection with the drawings forming part of this specification.

In the drawings:

Figure 1 is a top plan view of the dough cutter embodying the present invention.

Figure 2 is a perspective view of the same with one of the cutters shown in part, broken away.

Figure 3 is a bottom plan view of the cutter.

Figure 4 shows the cutter at the beginning of the cutting operation with the ejector and compressor plunger retracted.

Figure 5 shows the cutter having penetrated the sheet of dough and the shape taken by the dough blank because of the cutting operation.

Figure 6 shows the ejector and compressor plunger in contact with the blank, forming and expanding the same against the wall of the cutter.

Referring more particularly to the drawings, wherein like numerals and references designate corresponding parts throughout the several views, 1 indicates a base plate upon the under side of which is solidly affixed by bolts or screws a plurality of cylindrical cutting members 2 whose shape is that of the desired dough blank. The cylindrical cutting members have their lower edges sharpened as at 2ª.

Located in the annular opening of each cylindrical cutting member 2 is an ejector and compressor 3 in the form of a piston whose function will be described in detail later.

Formed on top of each ejector and compressor 3 is a stem or rod 4 having an upper threaded portion which is threaded into a collar 4ª, said collar having a hole therethrough at a right angle to the rod 4. The base plate 1 has openings therein through which the stem or rod 4 penetrates. Between the base plate 1 and the ejector and compressor 3, and encircling the stem or rod 4 is a spring 5 whose function is to normally hold the ejector and compressor 3 in its lower position; that is, in a plane parallel with the sharp edge of the cutting member 2.

Above the base 1 are two iron bars 6 spaced apart, both being bent so that each end of said bars is below the base 1 at the end of the cutter, but whose center portion is over the center portion of the cutter. These bars 6 are connected on each end by bars 8 which form gripper handles for operating the compressor and ejector 3. Between the two iron bars 6 over the center of each row of cutters is a trunnion rod 7 whose ends are mounted in the bars 6. These trunnion rods 7 penetrate the collars 4ª attached to the compressor and ejector rods 4. Thus it will be seen that the position of the ejectors and compressors 3 within the cylindrical cutters are controlled by the gripper handles 8 through bars 6, trunnion rods 7, and collars 4ª, attached to the upper ends of the combined ejectors and compressors 3.

For moving the cutter over different sections of the sheet of dough and to the cooking pans the same is held by the handles 9, affixed to each end of the rectangular base plate 1.

In each cylindrical cutting member 2 are arranged docking pins 14, said docking pins being firmly attached to the base plate 1. The function of these sharpened pins is well known in that they are used to prick or make holes in the blank of dough for the escape of steam, generated during the cooking or baking of the blank. The docking pins 14 in each cutting member 2 are arranged so that when the cutter is brought down in contact with the sheet of dough, the docking pins slightly penetrate the upper surface of the dough as the cutter severs the sheet into a blank. The ejector and compressor 3 has openings 13 therein corresponding in position and arrangement with the docking pins used in each cylinder and these openings 13 allow the ejector to be moved within the cutting member in that the docking pins penetrate the openings.

In the lower part of the wall of each cutting member 2 slightly above that portion of the cutter into which the blank of dough penetrates when cut, is a small opening or vent 15 to allow for the escape of air during the cutting operation and the escape of air on the pressing and expanding operation when the dough blank is expanded against the walls of the cutter to retain the same therein for panning. Experience has proven that a dough blank cut with a cutter having an opening in the wall thereof, will not contract or shrink on cutting as much as a blank cut with a cutter not having an opening. This vent 15 materially adds to the ease of operation of the cutter, especially when the cutters are arranged in a large group; for instance, a dozen or two dozen, which is the usual arrangement in commercial bakeries. I have found that by making the lower face of the combined ejector and compressor 3; i. e., that face which comes in contact with the upper surface of the sheet of dough, slightly convex, that said shape seems to materially assist in distributing the dough against the walls of the cutter during the compression stroke and that a blank compressed and diametrically expanded by a compressor having this shape will be retained in a secure manner within the cutter for panning.

To use the cutter, the same is taken in the two hands by the handles 9 and at the same time gripper handles 8 are moved towards the handles 9, thus moving the ejectors and compressors 3 up into the cutting members 2 away from the cutting edges 2ª. The cutter is then placed over a sheet of rolled dough which is ready for baking or cooking. The entire cutter is then pressed down on to the sheet of dough and blanks are cut therefrom by the cutting edges 2ª of the cutting members 2. While the cutter is in this position with the dough blanks contained within the cutter, the ejector and compressor members 3 are lowered to compress and diametrically expand the dough blank into contact with the walls of the cutter by releasing the gripper handles 8, the ejectors and compressors 3 being under tension of the spring 5. The gripper handles 8 are then kept in the same position and the entire cutter with the dough blanks therein can be removed to a pan or to some point of distribution. By a complete release of the gripper handles 8, the blanks of dough which are of uniform size and shape, are expelled from within the cutters. While in the drawings I have only shown an arrangement of six cutting units grouped to be handled as one unit, the most economical arrangement of the same is a unit which has a width corresponding to that of the sheet of dough to be cut and panned. Likewise, a single cutter can be used as a unit for household use.

It often happens that a sheet of rolled yeast dough ready to be cut varies as much as $\frac{3}{16}$ of an inch over a section corresponding to the size of a group of cutting units. In order to compensate for this variation in the thickness of the dough and to assure that all blanks will be compressed and held within the several cutters until it is desired to eject them, it is necessary to arrange the compressors and ejectors 3 so that each ejector and compressor will seek a proper position on the blank when the gripper handles 8 are released. This is done by making the holes somewhat enlarged in the bars 6 where the bars 8 enter and by making the holes in the collars 4ª somewhat larger than the trunnion rods 7 which enter the same. This construction allows each compressor and ejector 3 a sufficient independence of movement over the other ejectors while still being under the control of the gripper handles 8 and still performing the same function as all of the other ejectors and compressors.

What is claimed is—

1. The method of simultaneously cutting, forming and handling a plurality of dough blanks which comprises severing simultaneously a plurality of dough blanks from a sheet of prepared dough within the confines of a cutter individual to each blank being cut and having an unbroken perimeter, pressing and expanding diametrically and simultaneously the plurality of severed dough blanks into contact with the walls of the several cutters to an extent that said blanks will be held within the confines of the cutters and supported thereby, removing simultaneously the plurality of cut dough blanks within the confines of the cutters to a point remote from the point of cutting operation and thereafter expelling simultaneously the dough blanks from the cutter.

2. The method of simultaneously cutting, forming and handling a plurality of dough blanks which comprises severing simultaneously a plurality of dough blanks from a sheet of prepared dough within the confines of a cutter individual to each blank being cut and having an unbroken perimeter, piercing simultaneously the plurality of dough blanks, pressing and expanding diametrically and simultaneously the plurality of severed dough blanks into contact with the walls of the several cutters to an extent that said blanks will be held within the confines of the cutters and supported thereby, removing simultaneously the plurality of cut dough blanks within the confines of the cutters to a point remote from the point of cutting operation and thereafter expelling simultaneously the dough blanks from the cutter.

3. In a dough cutting and handling device, the combination of a plurality of cutting members, a plate common to said members and supporting the same, a plunger individual to each cutting member and located within the latter, actuating means connected to all of the plungers above the plate, means normally tending to move the plunger out of the cutting member and resisting the movement of the plunger in the opposite direction, handles for the plate and actuating means located at opposite ends thereof, the handles for the former being located above the latter.

CHARLES GAINER TURNER.